United States Patent [19]

Nestor

[11] 4,420,900
[45] Dec. 20, 1983

[54] AUTOMATIC FISHING JIGGER

[76] Inventor: John M. Nestor, 2397 Penny La., Youngstown, Ohio 44515

[21] Appl. No.: 262,748

[22] Filed: May 11, 1981

[51] Int. Cl.³ .............................................. A01K 97/12
[52] U.S. Cl. ........................................ 43/17; 43/19.2; 43/26.1
[58] Field of Search ................. 43/27.4, 17, 19.2, 26.1

[56] References Cited

U.S. PATENT DOCUMENTS

| 2,746,198 | 5/1956 | Smith | 43/19.2 |
| 3,789,534 | 2/1974 | Yankaitis | 43/19.2 |
| 3,981,095 | 9/1976 | Shepherd | 43/19.2 |
| 4,084,342 | 4/1978 | Phillip | 43/19.2 |
| 4,120,112 | 10/1978 | McBain | 43/19.2 |
| 4,214,394 | 7/1980 | Shogan | 43/17 |

FOREIGN PATENT DOCUMENTS 665878  6/1979  U.S.S.R. ............................... 43/19.2

Primary Examiner—Nicholas P. Godici
Assistant Examiner—Richard K. Seidel
Attorney, Agent, or Firm—Harpman & Harpman

[57] ABSTRACT

An electric fishing jigger for alternately raising and lowering a fishing line in an irregular fashion has an electric motor driving an offset resilient arm to which the fishing line is detachably engaged. The motor is powered by batteries and both are encased and attached to a fishing rod. A line activated alarm switch alerts the operator when a fish takes the bait.

7 Claims, 5 Drawing Figures

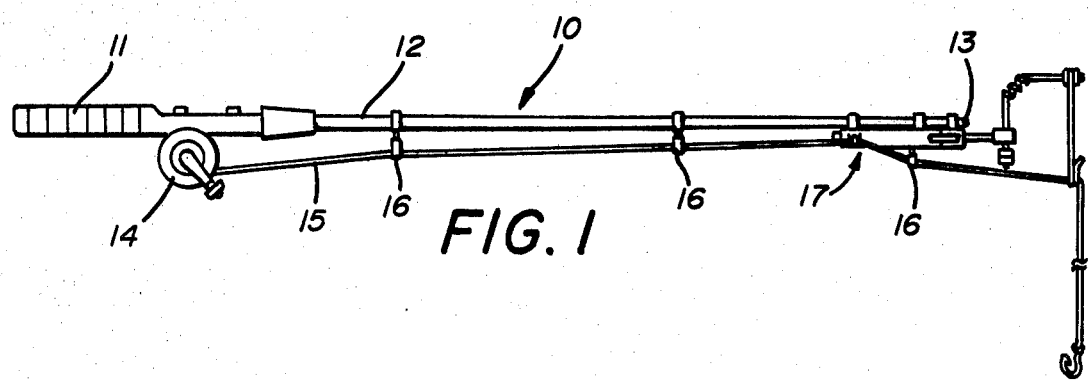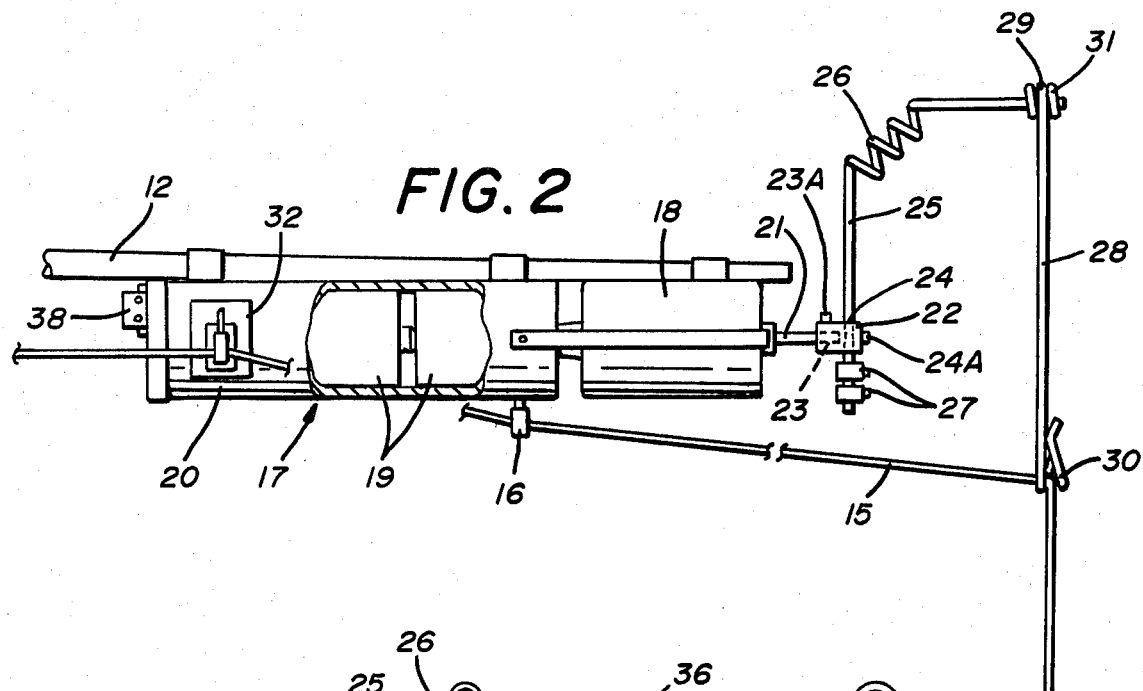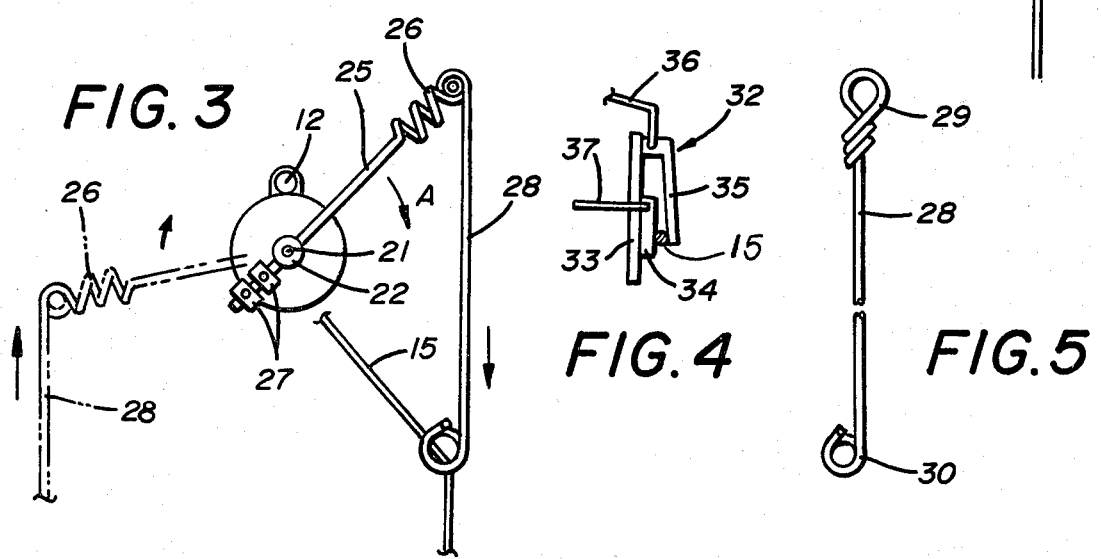

AUTOMATIC FISHING JIGGER

BACKGROUND OF THE INVENTION (1) Field of the Invention

This invention relates to automatic fishing line jiggers that repeatedly move the line up and down to create a desirable motion of a fishing lure on the end of a line.

(2) Description of the Prior Art

Prior art devices have used a number of different ways to jig a fishing line. See for example U.S. Pat. Nos. 2,746,198, 3,789,534 and 4,120,112.

In U.S. Pat. Nos. 2,746,198, a fish jigger is disclosed having a horizontally reciprocation device attached to an elongated shaft for uniformly moving an arm to which the fishing line is secured.

U.S. Pat. No. 3,789,534 discloses an attachment for a fishing rod wherein an electric motor drives a disc with an offset pin take off to move a reciprocating arm in an irregular ovaloid path to vibrate the fishing line.

U.S. Pat. No. 4,120,112 shows a device for agitating a fishing line in a regular motion created by a series of gears driving a reciprocating arm in an arcuate motion.

Applicant's device consists of an L-shaped arm having a resilient section between the horizontal and vertical portions thereof which when driven by an electric motor and battery attached to the end of the fishing rod imparts a rotary motion thereto and to a connector rod which supports the fishing line. The resilient portion results in moving the line in an irregular motion which is imparted to the bait so as to attract fish thereto. The effect is improved by the elasticity of the fishing line.

SUMMARY OF THE INVENTION

An automatic fishing jigger for attachment to a fishing rod has a self-contained power and drive mechanism alternately raising and lowering the fishing line in the water in an irregular life-like motion. The device has a line activated alarm signal to indicate the presence of a fish on the line. A flexible control arm enables the device to be set to impart a different amount of jigging to the fishing line.

DESCRIPTION OF THE DRAWINGS

FIG. 1 is a plan view of the fishing jigger on a fishing rod;

FIG. 2 is an enlarged portion of the fishing jigger seen in FIG. 1;

FIG. 3 is an end view on lines 3—3 of FIG. 2;

FIG. 4 is an enlarged view of the alarm switch; and

FIG. 5 is an enlarged view of a portion of the fishing jigger seen in FIGS. 1 and 2.

DESCRIPTION OF THE PREFERRED EMBODIMENT

Referring to FIGS. 1 and 2 of the drawings, a fishing rod 10 will be seen having a handle 11 with a rod 12 extending therefrom. The rod 12 is tapered from a larger diameter adjacent the handle 11 to a smaller diameter at its opposite end which is indicated at 13. A fishing reel 14 is attached to the handle portion 11 and has a fishing line 15 stored thereon and extending therefrom. The line 15 runs parallel with the rod member 12 and is supported by a plurality of annular guides 16 in spaced relation to one another along the rod 12.

An automatic fishing jigger 17 is attached to the end portion 13 of the rod member 12 so that it is suspended below the horizontal axis of the rod 12.

The automatic fishing jigger 17 comprises an electric motor 18 connected to batteries 19 in an enclosure 20. The electric motor 18 has a drive shaft 21 onto which a coupling 22 is secured. The coupling 22 has an axial bore 23 and a vertical bore 24 with set screws 23A and 24A respectively, positioned therein. A generally L-shaped arm 25 extends from the vertical bore 24 of the coupling 22 and has a resilient coil section at the point of transition 26 between the vertical and horizontal sections as best seen in FIG. 2 of the drawings.

The resilient coil section 26 acts as a spring allowing the horizontal section of the arm 25 to flex. A pair of counter weights 27 are fastened to the vertical end of the arm 25 below the coupling 22 to help balance the extended mass of the arm 25.

A line connector 28 seen in FIGS. 2, 3 and 5 of the drawings is comprised of an elongated section of wire with modified eyelets 29 and 30 at each end. The line connector 28 is pivotally secured to the end of the horizontal section of the arm 25, a bushing 31 engaging the eyelet 29 so as to allow the line connector 28 to rotate freely. The other modified eyelet 30 has an overlapping coiled configuration which is used to releasably hold a portion of the fishing line 15 so that a light pull on the line will disengage it.

By referring now to FIG. 3 of the drawings, the action of the arm 25 can be seen wherein the resilient coil 26 acts as a spring by deflection as the arm is rotated in a path indicated by an arrow A. This deflection decreases the vertical motion of the line connector 28 as it rotates freely on the end of the arm 25 and reduces the effect of the inherent elasticity of the fishing line 15 when moving the fishing line and the bait in an irregular life-like motion.

An alarm switch 32 as best seen in FIGS. 2 and 4 of the drawings is mounted on the enclosure 20 and comprises a base member 33 which is made of an electrically insulating material on which is positioned a contact plate 34. A metallic switch reed 35 is also mounted to the base member 33 and is offset with respect thereto. A pair of electrical contacts 36 and 37 are connected to the contact plate 34 and switch element 35 respectively.

An alarm light and buzzer 38 is connected to a simple circuit to the alarm switch 32 and the battery 19 as will be understood by those skilled in the art.

In operation the fishing line 15 is inserted between the contact plate 34 and switch reed 35 spacing them apart so that the circuit to the alarm light and buzzer is incomplete. When a fish strikes, the line 15 is pulled from the modified eyelet 30 and from its position between the contact plate 34 and the switch reed 35 allowing them to make contact and complete the circuit activating the alarm 38 and alerting the user.

Thus it will be seen that a new and useful fishing jigger has been illustrated and described and it will be apparent to those skilled in the art that various changes and modifications may be made herein without departing from the spirit of the invention.

Having thus described my invention what I claim is:

1. An automatic fishing jigger comprised of an enclosure secured to a fishing rod, a fishing line on said rod, a motor in said enclosure having a drive shaft, an arm on said drive shaft, means for flexing the arm, a line connector connected pivotally to the arm, means for detachably securing said fishing line to said line connector, an alarm device secured to said enclosure and means for activating said alarm device, a power source in said enclosure.

2. The automatic fishing jigger of claim 1 wherein said arm is L-shaped and said means for flexing said arm is a resilient coil forming a portion of the arm.

3. The automatic fishing jigger of claim 1 wherein said line connector is a wire and said means of securing the fishing line to the line connector is an overlapping coiled configuration in the wire into which the line is temporarily positioned.

4. The automatic fishing jigger of claim 1 wherein said alarm device comprises a light and buzzer connected in an electric circuit to said power source.

5. The automatic fish and jigger of claim 1 wherein said activating means is a metallic switch reed spaced in relation to a contact plate by the insertion of a portion of the fishing line.

6. The L-shaped arm of claim 2 wherein said arm has at least one counter weight attached thereto.

7. The automatic fishing jigger of claim 1 wherein said line connector is an elongated section of wire having modified eyelets on each end.

* * * * *